Figures 1, 2:
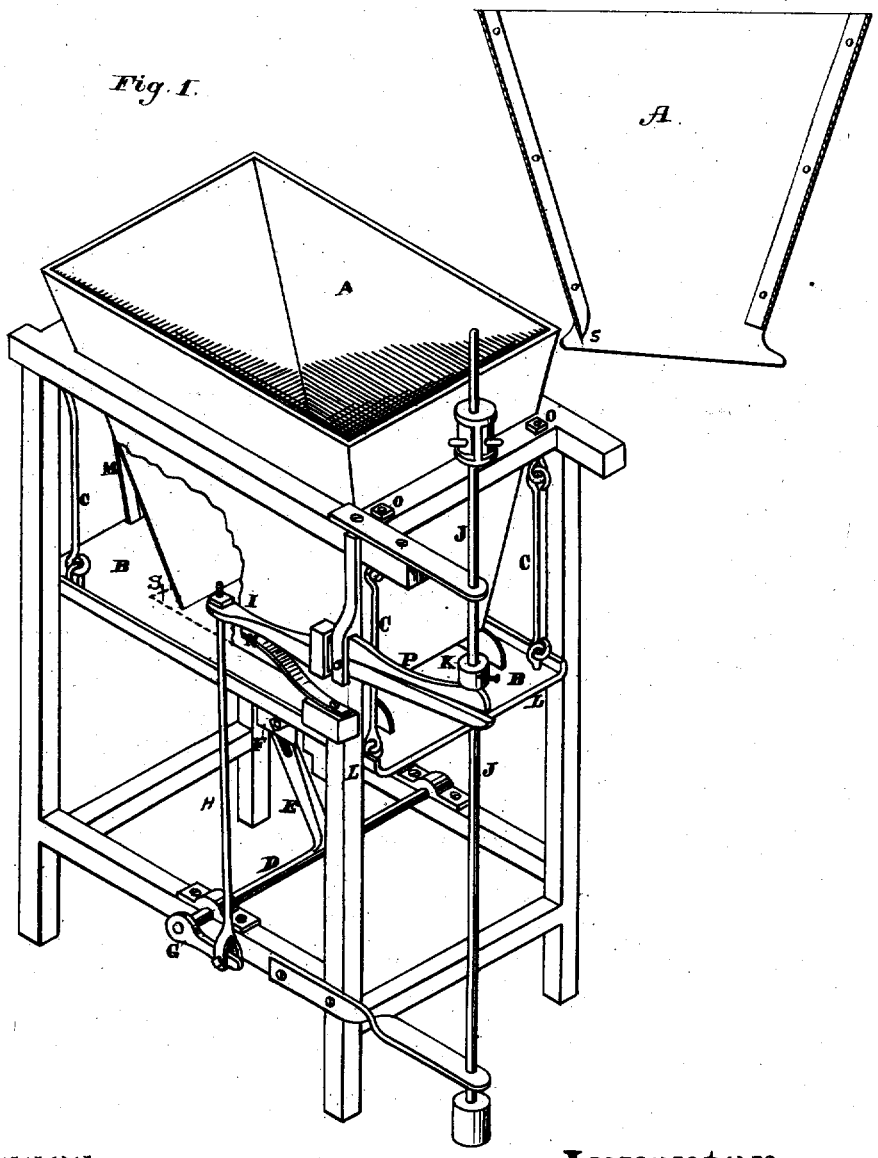

J. TULLOCK.

Assignor, by mesne assignments, to F. OGDEN.

Ore-Stamp Feeder.

No. 7,906. Reissued Oct. 9, 1877.

Witnesses

Geo. H. Strong

Alex. T. Stacy

Inventor

James Tullock

By his Atty's

Dewey & Co.

N. PETERS, PHOTO-LITHOGRAPHER, WASHINGTON, D. C.

UNITED STATES PATENT OFFICE.

JAMES TULLOCK, OF JAMESTOWN, CALIFORNIA, ASSIGNOR, BY MESNE ASSIGNMENTS, TO FREDERICK OGDEN.

IMPROVEMENT IN ORE-STAMP FEEDERS.

Specification forming part of Letters Patent No. 144,714, dated November 18, 1873; Reissue No. 6,554, dated July 20, 1875; Reissue No. 7,906, dated October 9, 1877; application filed November 15, 1876.

*To all whom it may concern:*

Be it known that I, JAMES TULLOCK, of Jamestown, Tuolumne county, State of California, have invented a Feeder for Crushing-Mills; and I do hereby declare the following description and accompanying drawings are sufficient to enable any person skilled in the art or science to which it most nearly appertains to make and use my said invention without further invention or experiment.

My invention relates to an improved device for feeding ore or other substances to crushing-mills; and it consists in the use of a longitudinally-vibrating tray, which is operated below the hopper in which the ore is contained, so as to receive the ore from the hopper and feed it over the forward or lower end of the tray into the battery or other crushing-mill.

The tray is suspended by links, and the back-and-forth motion is imparted to it by means of a rock-shaft and arm and an intervening mechanism which connects the rock-shaft with the stamp-stem. The tray is stopped abruptly at the end of each forward vibration by concussion against a stationary block or bar, so as to give a sudden jar to loosen up the ore contained in the tray, and prevent it from packing or sticking.

Reference is had to the accompanying drawings for a more complete explanation of my invention, in which—

Figure 1 is a perspective view, and Fig. 2 is a cross-section, of the hopper.

A is an ore-hopper, supported by a suitable frame-work. Beneath this hopper is the tray B, which receives the ore from the hopper as fast as may be desired.

The tray B is inclined as much as may be desired, and is suspended by the links C from the frame O, so that it can receive an oscillating motion forward and back. Beneath the tray a rock-shaft, D, crosses the frame transversely, and an arm, E, extends upward, and is secured by a pin passing through the lugs F on the bottom of the tray, and through the slotted upper end of the arm E. The end of the shaft D has a crank, G, formed upon it, and from this crank the rod H connects with one end of a lever-arm, I. This lever is pivoted near its middle to the frame, and the other end extends to a point near the stamp-stem J. An adjustable collar, K, is secured to the stem J, and whenever the stamp falls this collar will strike the end of the lever, and, through the connecting-rod H, the rock-shaft will be operated so as to draw the tray back. When the stamp is again raised, the tray will be allowed to swing forward until the lugs F strike a bar or post, L, which will abruptly stop the tray, and thus tend to loosen and throw forward its contents, this feature being especially valuable when the ore is wet.

The tray is set at a slight inclination, so that the ore will descend toward the feeding or lower end by gravity. The lower edges of the opening at the bottom of the hopper A are all horizontal, and as the tray is inclined, its bottom will pass close to the rear lower edge S of the hopper-opening, while a sufficiently-wide space will be left between the forward lower edge of the hopper-opening and bottom of the tray for the ore to pass through in descending to the battery. As the tray swings back and forth, the rear lower edge S of the hopper will, therefore, serve as a scraper to scrape the bottom of the tray at each backward movement, and thus force the ore down the incline. In order to move the tray forward after each backward movement, I apply a spring, M, so that it will press against its rear end, and thus insure a quick forward motion. This spring is especially required in feeding wet ore, that has a tendency to stick in the tray and clog its movement.

If desired, a spring, P, can be placed upon the end of the lever which is struck by the collar K, so as to relieve the strain and transmit the force gradually.

Suitable adjusting-screws, to regulate the movements of the different parts and the amount of ore beneath the stamp, will regulate the amount fed.

The ordinary method of mounting and operating the tray which feeds the ore is to shake only one end with an up-and-down or side motion, resulting, in fact, in a simple jar; but by my arrangement the tray swings gently lengthwise, while the lower rear edge of the hopper serves as a scraper.

Automatic devices for feeding ore to stampmills have long been used; but the operation of all such previous machines was uncertain. They would feed dry ore well enough; but until I applied a scraper, by means of the rear edge of the hopper, for producing a positive action, so as to force the ore forward into the battery, it was impossible to feed wet or sticky ore with any degree of certainty.

It is evident, therefore, that the application of the scraping-edge to this class of machines has rendered them positive and certain in their action where before they were uncertain and almost useless.

Having thus described my invention, what I claim, and desire to secure by Letters Patent, is—

1. In a machine for feeding ore to crushing-mills, the stationary hopper A, in combination with a longitudinally-vibrating tray or shoe, B, substantially as and for the purpose described.

2. In combination with an inclined moving tray or ore-supporting table, a stationary scraper, S, formed of the rear edge of the hopper, substantially as and for the purpose described.

3. The spring M, arranged to press the tray B forward after each backward movement, substantially as before described.

4. The oscillating tray B, supported by the links C, and operated by the shaft D, with its rocker-arm E and crank G, rod H, together with the lever I, the whole operated from the stem J by means of the adjustable collar K, substantially as and for the purpose described.

5. In combination with the oscillating tray B, as herein shown, the post or bar L, for giving a concussive or abrupt stop to the tray, substantially as and for the purpose described.

In witness whereof I hereunto set my hand.

JAMES TULLOCK.

Witnesses:

J. L. BOONE,

CHAS. G. PAGE.